April 29, 1924.

G. W. SWIFT, JR 1,492,490

MACHINE FOR MAKING DOUBLE FACED CELLULAR PAPER BOARD

Filed Nov. 1, 1919 2 Sheets-Sheet 1

INVENTOR
George W. Swift Jr.
BY
ATTORNEYS

WITNESSES
Oliver W. Holmes

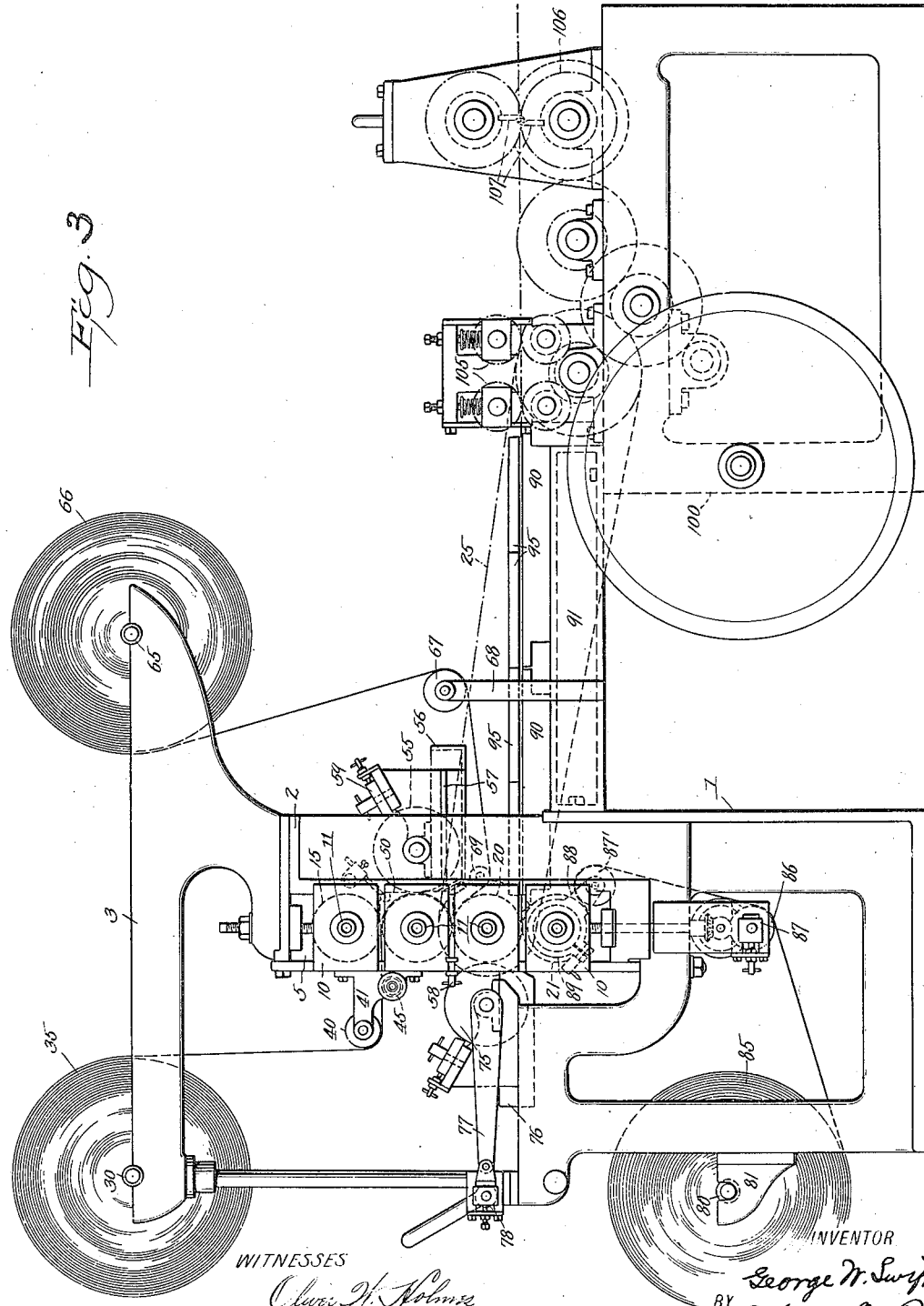

Patented Apr. 29, 1924.

1,492,490

UNITED STATES PATENT OFFICE.

GEORGE W. SWIFT, JR., OF BORDENTOWN, NEW JRESEY.

MACHINE FOR MAKING DOUBLE-FACED CELLULAR PAPER BOARD.

Application filed November 1, 1919. Serial No. 335,048.

*To all whom it may concern:*

Be it known that I, GEORGE W. SWIFT, Jr., a citizen of the United States, residing at Bordentown, county of Burlington, and State of New Jersey, have invented certain new and useful Improvements in Machines for Making Double-Faced Cellular Paper Board, of which the following is a specification.

The present invention relates to improvements in mechanism for producing double-faced, cellular, paper board.

In Patent No. 1,263,000, granted to me April 16th, 1918, I have covered a machine for making corrugated paper board having but one facing-sheet. The present machine is similar in some of its details to the machine of said patent and may, therefore, be considered an improvement upon that machine to adapt it to manufacture double-faced, cellular, paper board.

In the production of this double-faced, cellular, paper board as now manufactured, a single-faced, corrugated, paper board is first produced by any suitable means and wound upon reels or deposited more or less indiscriminately upon the floor of the shop: then, this single-faced product, after it is completely dried and set, is fed in a continuous strip to a machine which applies the second facing strip. A machine for this purpose is shown in the Swift Patent No. 917,503, dated April 6th, 1909.

This old method of producing double-faced, cellular, paper board has been practised for a number of years although there are certain objectionable features incident to said method which had not been obviated prior to the present invention.

It is necessary to exercise great care in the production of this double-faced, cellular, paper board because of the tendency of the product to curl or warp under the unequal strain upon the two facing-sheets that enclose the corrugated sheet. This warping tendency is brought about largely by the method of manufacture just referred to, in which the corrugated strip is made, glued to one facing-sheet and completely dried before the second facing-sheet is applied. This double moistening and drying, first with two sheets and next with three, causes an unequal expansion and contraction of the several plies and frequently results in a composite board having unequal strains in its facing-sheets, which sometimes warps the paper board and invariably injuries its strength.

I propose to avoid this warping tendency in this double-faced, cellular, paper board by providing a machine that will apply both facing-sheets to the opposite crowns of the enclosed corrugated sheet in a single operation, practically simultaneously with the formation of the corrugated sheet, so that both facing-sheets will be applied under exactly the same conditions of heat, moisture and tension with the result that the finished product will be a perfectly flat, stiff board without any tendency to curl or warp. With this method of operation I obtain an economical application of heat and moisture and carry out the entire process directly under the eye of the operator so that adjustments can be quickly and accurately made to bring about a proper cooperation of the different parts of the machine.

The tendency of the finished product to curl or warp is also due in a measure to the application of unequal tension to the facing-sheets when they are applied to the corrugated sheet, causing the facing-sheets to differ slightly in length. To avoid this possible inequality in set or tendency, the improved machine applies the facing-sheets under equal tension, while they are properly stretched and registered upon a feed roller. It is desirable that the lines of first contact of the facing-sheets with the crowns of the enclosed corrugated sheet should be as close together as possible upon the periphery of the applying cylinder, but I have found that the most convenient arrangement is to have these lines of application of the two facing sheets on diametrically opposite points upon the cylinder. To further insure equality in relative strain between the two facing-sheets, I propose to provide for the adjustment of one of the facing-sheet feed rollers tangentially to the other feed roller, thereby enabling the operator to quickly equalize the facing-sheets during the operation of the machine.

The two facing-sheets are fed in from opposite sides of the machine and applied to the corrugated sheet in quick succession upon lines diametrically opposite upon the applying roller, the finished product passing tangentially from between the two pressure rollers and extending over a horizontal drying table over which the cellular board passes while it is held perfectly flat by suitable pressure means until it is completely dried and hardened.

In order that the invention may be fully understood it will first be described with reference to the accompanying drawings and afterwards more particularly pointed out in the annexed claim.

Figure 3 is a diagrammatic representation of the machine shown in Figure 1 combined with the drying mechanism, the feed mechanism and the automatic cutting mechanism, whereby the finished cellular paper-board can be delivered in sheets of any desired sizes.

Figures 1, 2:
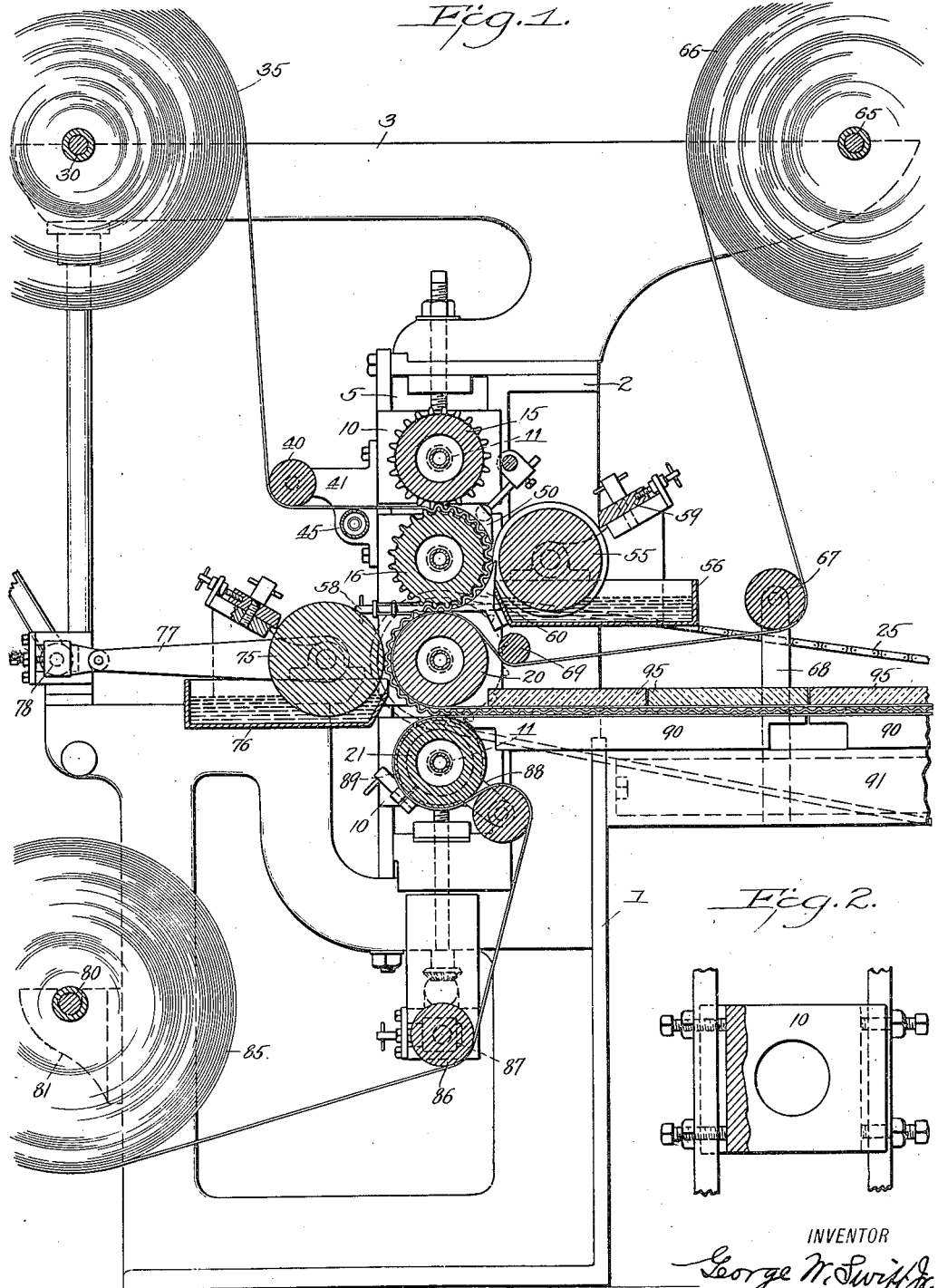
Figure 1 is a vertical, longitudinal, sectional elevation of one embodiment of the present invention.
Figure 2 is a detail view illustrating a form of adjustment for one of the facing-applying rollers.

The invention of the present application consists, in a comprehensive sense, of the reorganization and rearrangement of the well known elements of machinery for producing cellular paper-board and with this conception the exact details of construction are immaterial to its scope. In the following description, therefore, the essential elements are referred to in a general sense without any intention of limiting the inventive idea to specific details. The invention is an important advance in the art of producing double-faced, cellular paper-board, not only from an economical standpoint because of the compact association of the cooperating elements, but also because of the provision for accurate cooperation of the parts whereby practical difficulties are overcome and a superior product is produced.

In the machine as illustrated there are two side frames properly tied and braced together and each consisting of a base frame 1, an intermediate frame 2, and a top frame 3. These frames are so secured together as to produce a rigid support for the parts of the machine in question.

The intermediate side frames 2 are constructed with vertical guide channels 5, in which are mounted for vertical adjustment a series of rectangular, bearing blocks 10, in which are journaled the axle bearings 11 of a series of four rollers, which will now be referred to.

The upper pair of rollers 15, 16 are formed with longitudinally, corrugated, intermeshing peripheries such for instance as the upper pair of corrugating rollers of my above named Patent No. 1,263,000. Beneath the corrugating rollers suitably journaled in the lower pair of bearing blocks 10 are the smooth, facing-sheet, applying rollers 20, 21. By preference the main applying roller 20 has its bearings fixed, while the bearings of the two corrugating rollers and the remaining smooth roller are adjustable with relation thereto causing them to cooperate in the manner presently to be described. This main smooth roller 20 is suitably geared to and drives the corrugating rollers and the other smooth roller. The roller 20 is driven by sprocket chain 25 operated from the main shaft of the automatic feeding and cutting mechanism and shown in Figure 3 of the drawings.

It will be understood that the several rollers or cylinders 15, 16, 20 and 21 are provided with suitable steam heating devices of any suitable construction, such for instance as shown in my above named Patent No. 1,263,000.

Supported upon the top side frames 3 is an axle 30 carrying between the side frames a roll 35 of straw paper or other suitable material from which the corrugated or cellular interior of the paper board is to be made. The web from roll 35 passes downwardly around an idler roller 40, freely journaled in brackets 41, rigidly secured to the central side frames 2. From the idler roller 40 the straw paper 35 passes over the web, moistening, perforated, steam pipe 45 supported between brackets 41 and supplied with steam in the proper quantity from any suitable source in the usual way. The web 35 passes from the steam pipe 45 into the bite of the pair of corrugating rollers 15, 16 by which the web is continuously corrugated transversely of its length as it is drawn from its roll.

Stripping guides 50 project into annular grooves of the upper corrugating roller 15 to insure the corrugated sheet following the periphery of the lower corrugating roller 16. These stripping guides 50 are the same as illustrated in my above named patent.

55 is a gluing roller mounted in suitable bearings upon the sides of a glue trough 56 formed with flanges 57, which rest and slide upon suitable bracket flanges of the machine side frames between which the gluing device is mounted. A scraper 59 of usual construction operates upon the periphery of the gluing roller 55. A suitable adjusting device, such as illustrated at 58, may be provided for moving the gluing mechanism toward and away from the lower corrugating roller 16 so that the glue roller 55 can be held in engagement with the crowns of the corrugated sheet as it is carried downwardly by the roller 16, or can be adjusted away from that roller when it is not in use. This glue roller 55 has a series of peripheral grooves to receive the stripping blades 60 suitably mounted upon the glue trough and arranged to insure the glued, corrugated sheet following the roller 16 after the glue is applied. These deflecting strippers 60 are the same as in my above named patent.

Mounted in the top side frames 3 at their inner ends is an axle 65 supporting between the side frames a roll of paper 66 from which one of the facing-sheets is produced. The web from the roll 66 passes downwardly around an idler roller 67 supported between bracket arms 68 and from thence beneath the glue trough 56 around a second idler roller 69, which guides the upper web toward the periphery of the rotating, main, smooth faced roller 20. The paper comes in close contact with the roller 20 and is accurately set and tensioned over the surface of that roller just prior to the line of contact between roller 20 and the glued crowns of the corrugated sheet carried by the lower corrugating roller 16, so that when the facing web or sheet 66 is brought in rolling contact with the glued crowns of the corrugated sheet, the two webs will be firmly pressed together while the corrugated sheet is still supported upon the corrugations of roller 16 and as the two pass between rollers 16 and 20 they will be carried downwardly around roller 20 with the smooth first facing-sheet or web 66 closely fitting the surface of the applying roller 20.

75 is a second glue roller, 76 is a glue trough supporting roller 75 and formed with side guides 77, which rest and slide upon the upper face of lower side frames 1 between which the second gluing mechanism is mounted. 77 is a scraper operating upon the periphery of the glue roller 75. 78 is an eccentric mechanism for adjusting the glue roller 75 toward and away from the periphery of the roller 20.

As the roller 20 carries the attached corrugated web 35 and first facing web 66 downwardly, the exposed outer crowns of the corrugated web will have glue applied to them preparatory to receiving the second facing-sheet or web.

80 is an axle mounted in bracket bearings 81 secured to the lower side frames 1 and supporting between the side frames a roll of facing paper 85. The web from which passes around an adjustable idler roller 86 mounted in adjustable bearings 87 in the lower side frames 1 and from said idler around an adjustable hug roll 87, which is freely journaled in the radial arms 88 extending from the split rings 89 encircling the cylindrical bearing hubs of the lower, main, bearing blocks and adjustably clamped thereon by means of the screws 69 connecting the arms of the split portion of the supporting rings. Only one of these adjustable supports for the hug roll is shown, but it will be understood that the device shown in Figure 1, as just described, is duplicated upon the opposite side of the machine.

The paper web 85 passes snugly around the roll 87 into close contact with the surface of the lower, smooth faced applying roller 21, which carries the web upwardly into contact with the exposed glued crowns of the corrugated web that is traveling around the lower portion of the main applying roll 20. By this means the second facing web or sheet 85 is pressed firmly into engagement with the glued crowns of the corrugated web upon a line approximately diametrically opposite the line of contact between applying cylinder 20 and corrugating roller 16, so that the two facing-sheets are applied in such quick succession that practically the intermediate web is corrugated and the two facing-sheets glued thereto in a simultaneous operation. At any rate the successive steps of corrugating and applying the facing-sheets upon opposite sides of the corrugated sheet follow each other in such quick succession that the operation is carried out from beginning to end under uniform conditions with the result that the two facing sheets can be applied under equal tension to a freshly corrugated web. The resulting product is far superior to that of the old method under which one facing-sheet was applied under certain conditions and the second facing-sheet was applied under different conditions.

To equalize the strain and relative length of the two facing-sheets, I have found it very desirable to provide for the relative adjustment of the lower applying roller 21 in a horizontal plane tangentially, of the main, applying roller 20. This adjustment can be carried out in various ways such for instance as by the mechanism shown in Figure 2 of the drawing.

After the corrugated web and the two facing-webs have been united between the smooth faced rollers 20 and 21 it is essential that the attached webs be passed from the applying rollers tangentially to both of said rollers and be maintained in that relation until completely dried and hardened. This finishing step of the operation can be accomplished by various mechanisms.

In the drawings I have illustrated a horizontal table consisting of a plurality of suitably heated, polished, steel plates 90 mounted upon the rectangular heating oven or hollow support 91, which is fastened to the side frames 1 and to the side frames 100 of the automatic feeding and cutting machine. The cellular product issuing between rollers 20 and 21 passes over these hot plates 90 and is confined thereon by a pressure belt or by the means shown in the drawings in which a series of heavy glass plates 95 suitably supported at their ends and properly spaced from the hot plates 90 to permit the web of drying, cell board to pass beneath them. The glass plates 95 not only serve to apply the proper pressure to the drying board, but they enable the operator to inspect the drying product without interfering with the operation of the machine.

The completely dried cellular paper board passing from between the hot plates 90 and the glass plates 95 to suitable, delivery, feed mechanism, such for instance as the feed rollers 105 of the automatic machine covered by my Patent No. 1,343,487, dated June 15th, 1920, for variable automatic control mechanism as shown in said patent and diagrammatically illustrated in Figure 3 of the drawings of my present case: these paired feed rolls carry the quickly dried web of the cellular paper board forwardly and pass it between rolls 106 provided with web cutting knives 107 arranged askew on the rolls 106 for making a cut across the web of the cellular board. These rolls and knives remain at rest during certain intervals between the cutting operations which occur periodically under the control of the automatic mechanism which forms no part of the present invention.

I claim:

The combination of suitable mechanism for corrugating a paper web, a pair of rollers closely associated with said corrugating mechanism cooperating to simultaneously apply facing-sheets or webs upon the opposite faces of the corrugated web, means for guiding and tensioning said facing sheets or webs upon said rollers prior to their application to said corrugated web, means for adjusting one of said facing-applying rollers tangentially of the other of said rollers, and means for delivering composite, cellular board in a plane tangential to said rollers.

GEORGE W. SWIFT, JR.